US011313466B2

(12) United States Patent
Chinta et al.

(10) Patent No.: US 11,313,466 B2
(45) Date of Patent: Apr. 26, 2022

(54) PISTON ASSEMBLY FOR AN INTERNAL COMBUSTION ENGINE OF A MOTOR VEHICLE

(71) Applicant: GM Global Technology Operations LLC, Detroit, MI (US)

(72) Inventors: Balakrishna Chinta, Troy, MI (US); John B Fisher, Flint, MI (US); Zheng Ma, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 157 days.

(21) Appl. No.: 16/555,573

(22) Filed: Aug. 29, 2019

(65) Prior Publication Data

US 2021/0062916 A1 Mar. 4, 2021

(51) Int. Cl.

| | |
|---|---|
| ***F16J 9/20*** | (2006.01) |
| ***F16J 1/08*** | (2006.01) |
| ***F16J 1/00*** | (2006.01) |
| ***F02F 5/00*** | (2006.01) |

(52) U.S. Cl.

CPC .................. *F16J 9/20* (2013.01); *F02F 5/00* (2013.01); *F16J 1/001* (2013.01); *F16J 1/08* (2013.01)

(58) Field of Classification Search

CPC ......... F16J 9/00; F16J 9/20; F16J 9/22; F16J 9/24; F16J 1/08; F16J 1/09; F16J 1/001; F02F 3/00; F02F 5/00; F02F 2003/0007

See application file for complete search history.

(56) References Cited

U.S. PATENT DOCUMENTS 1,369,592 A * 2/1921 White ...................... F16J 9/206 277/434
1,499,571 A * 7/1924 Davis ......................... F16J 9/20 277/434
2,591,920 A * 4/1952 Colvin ....................... F16J 9/00 277/434
RE24,930 E * 1/1961 Marien .................... F16J 9/203 277/463
3,554,568 A * 1/1971 Heid, Jr. .................... F16J 9/20 277/452

(Continued)

FOREIGN PATENT DOCUMENTS

CN 1776207 A 5/2006
CN 103174540 A 6/2013

(Continued)

*Primary Examiner* — Grant Moubry
(74) *Attorney, Agent, or Firm* — Vivacqua Crane, PLLC

(57) ABSTRACT

A piston assembly for an internal combustion engine of a motor includes a piston head having an outer diameter surface spaced a first distance from the longitudinal axis and an annular surface spaced a second distance from the longitudinal axis, with the second distance being less than the first distance. Upper and lower walls extend between the annular surface and the outer diameter surface so as to define an annular groove in the outer diameter surface. A piston ring is received within the annular groove and includes an inner diameter surface facing the annular surface of the piston head. The inner diameter surface of the piston ring and the annular surface of the piston head cooperate with one another to define a plurality of pockets angularly spaced from one another about the longitudinal axis and configured to receive oil.

13 Claims, 4 Drawing Sheets

(56) References Cited

U.S. PATENT DOCUMENTS

| | | | | |
|---|---|---|---|---|
| 4,371,174 | A * | 2/1983 | Gurtler | F16J 9/00 277/434 |
| 6,536,385 | B1 | 3/2003 | Takashima | |
| 6,631,908 | B2 * | 10/2003 | Mittler | F16J 9/20 277/458 |
| 9,109,699 | B2 * | 8/2015 | Jang | F16J 1/04 |
| 9,334,959 | B2 * | 5/2016 | Hartford | F16J 9/26 |
| 10,087,881 | B2 * | 10/2018 | Miller | F02F 3/0084 |
| 10,359,114 | B2 * | 7/2019 | Seki | F16J 15/24 |
| 2002/0101039 | A1 * | 8/2002 | Bloemers | F16J 9/24 277/435 |
| 2004/0217550 | A1 * | 11/2004 | Lee | F16J 9/12 277/459 |
| 2008/0265518 | A1 | 10/2008 | Fujioka | |
| 2010/0175551 | A1 * | 7/2010 | Stein | F16J 9/10 92/172 |
| 2012/0024149 | A1 * | 2/2012 | Brondolin | B22D 17/203 92/208 |
| 2014/0109764 | A1 * | 4/2014 | Jang | F16J 9/24 92/172 |
| 2016/0069455 | A1 | 3/2016 | Hartford et al. | |
| 2018/0023703 | A1 | 1/2018 | Petrus et al. | |
| 2019/0346043 | A1 * | 11/2019 | Gillen | F16J 9/20 |

FOREIGN PATENT DOCUMENTS

| | | | |
|---|---|---|---|
| CN | 106089484 | A | 11/2016 |
| CN | 206221086 | U | 6/2017 |
| CN | 108779856 | A | 11/2018 |
| JP | H06185406 | A | 7/1994 |
| JP | 2009257478 | A | 11/2009 |

* cited by examiner

PISTON ASSEMBLY FOR AN INTERNAL COMBUSTION ENGINE OF A MOTOR VEHICLE

INTRODUCTION

The present disclosure relates to piston assemblies for internal combustion engines, and more particularly, to a piston assembly that reduces Stochastic Pre-Ignition (SPI) for Internal Combustion engines (IC engines) of motor vehicles.

Automotive manufacturers are downsizing engines to improve fuel efficiency and reduce emissions of IC engines, and automotive manufacturers are applying turbocharger technology to recover power lost in the downsizing process. In certain turbocharged direct-injection vehicles that operate in low-speed and high-load driving conditions, Low-Speed Pre-Ignition (LSPI), also known as SPI, is a pre-ignition event that occurs when there is a premature ignition of the air-fuel mixture. More specifically, LSPI is caused by droplets of oil that mix with the fuel and ignite in the combustion chamber during a compression stroke. LSPI can result in pressure spikes within the cylinders, which can in mild cases produce knocking or banging noises and under higher pressure spikes cause wear or damage to engine components.

Thus, while current piston assemblies achieve their intended purpose, there is a need for a new and improved piston assembly that addresses these issues.

SUMMARY

According to several aspects of the present disclosure, a piston assembly for an internal combustion engine of a motor vehicle is provided. The assembly includes a piston head adapted to reciprocate along a longitudinal axis within a cylinder. The piston head includes an outer diameter surface spaced a first distance from the longitudinal axis and an annular surface spaced a second distance from the longitudinal axis, with the second distance being less than the first distance. The piston head further includes upper and lower walls each extending between the annular surface and the outer diameter surface so as to define an annular groove in the outer diameter surface. The assembly further includes a piston ring received within the annular groove. The piston ring includes a peripheral surface spaced a third distance from the longitudinal axis, with the third distance being more than the first distance such that the peripheral surface is adapted to slide against a wall of the cylinder in response to the piston head reciprocating along the longitudinal axis. The piston ring further includes an inner diameter surface facing the annular surface of the piston head. The piston ring further includes top and bottom side faces each extending between the peripheral surface and the inner diameter surface. The inner diameter surface of the piston ring and the annular surface of the piston head cooperate with one another to define a plurality of pockets angularly spaced from one another about the longitudinal axis and configured to receive oil.

In one aspect, the top and bottom side faces of the piston ring define a longitudinal wall thickness.

In another aspect, the peripheral surface and the inner diameter surface of the piston ring define a radial wall thickness therebetween.

In another aspect, the annular surface of the piston head includes a plurality of recesses that form at least a portion of the pockets.

In another aspect, each recess is defined by a pair of planar sidewalls extending perpendicularly from the annular surface and a planar end wall extending between the planar sidewalls.

In another aspect, the planar end wall is positioned perpendicularly relative to the planar sidewalls.

In another aspect, each recess is defined by a concave surface of the piston head extending radially toward the longitudinal axis.

In another aspect, the piston ring is rotationally fixed in one angular position relative to the piston head.

In another aspect, the inner diameter surface of the piston ring includes a plurality of recesses that form at least a portion of the pockets.

In another aspect, each recess is defined by a pair of planar sidewalls extending perpendicularly from the inner diameter surface and a planar end wall that extends between the planar sidewalls.

In another aspect, the planar end wall s positioned perpendicularly relative to the planar sidewalls.

In another aspect, each recess is defined by a concave surface of the piston ring extending radially away from the longitudinal axis.

In another aspect, the inner diameter surface is spaced a fourth distance from the longitudinal axis, and the fourth distance is longer than the second distance such that the piston ring is angularly movable relative to the piston head.

According to several aspects of the present disclosure, a piston assembly for a cylinder of an internal combustion engine of a motor vehicle is provided. The assembly includes a piston head adapted to reciprocate along a longitudinal axis within the cylinder. The piston head includes an outer diameter surface spaced a first distance from the longitudinal axis and an annular surface spaced a second distance from the longitudinal axis, with the second distance being shorter than the first distance. The piston head further includes upper and lower walls each extending between the annular surface and the outer diameter surface so as to define an annular groove in the outer diameter surface. The assembly further includes a piston ring received within the annular groove. The piston ring includes a peripheral surface spaced a third distance from the longitudinal axis, with the third distance being more than the first distance such that the peripheral surface is adapted to slide against a wall of the cylinder in response to the piston head reciprocating along the longitudinal axis. The piston ring further includes an inner diameter surface facing the annular surface of the piston head. The piston ring further includes top and bottom side faces each extending between the peripheral surface and the inner diameter surface. The inner diameter surface of the piston ring and the annular surface of the piston head cooperate with one another to define a plurality of pockets angularly spaced from one another about the longitudinal axis and configured to receive oil. The annular surface of the piston head is a continuously concave surface extending about the longitudinal axis.

In one aspect, the inner diameter surface of the piston ring includes a plurality of recesses forming at least a portion of the pockets.

In another aspect, each recess is defined by a pair of planar sidewalls extending perpendicularly from the inner diameter surface and a planar end wall extending between the planar sidewalls.

According to several aspects of the present disclosure, a piston assembly for a cylinder of an internal combustion engine of a motor vehicle is provided. The assembly includes a piston head adapted to reciprocate along a longitudinal axis within the cylinder. The piston head includes an outer diameter surface spaced a first distance from the longitudinal axis and an annular surface spaced a second distance from the longitudinal axis, with the second distance being shorter than the first distance. The piston head further includes upper and lower walls each extending between the annular surface and the outer diameter surface so as to define an annular groove in the outer diameter surface. The assembly further includes a piston ring received within the annular groove. The piston ring includes a peripheral surface spaced a third distance from the longitudinal axis, with the third distance being more than the first distance such that the peripheral surface is adapted to slide against a wall of the cylinder in response to the piston head reciprocating along the longitudinal axis. The piston ring further includes an inner diameter surface facing the annular surface of the piston head. The piston ring further includes top and bottom side faces each extending between the peripheral surface and the inner diameter surface. The inner diameter surface of the piston ring and the annular surface of the piston head cooperate with one another to define a plurality of pockets angularly spaced from one another about the longitudinal axis and configured to receive oil. The piston ring further includes an upper chamfered corner positioned between the top side surface and the inner diameter surface and a lower chamfered corner positioned between the bottom side surface and the inner diameter surface.

In one aspect, the inner diameter surface of the piston ring includes a plurality of recesses forming at least a portion of the pockets.

In another aspect, each recess is defined by a pair of planar sidewalls extending perpendicularly from the inner diameter surface and a planar end wall extending between the planar sidewalls.

In another aspect, the planar end wall is positioned perpendicularly relative to the planar sidewalls.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses.

Figure 1:
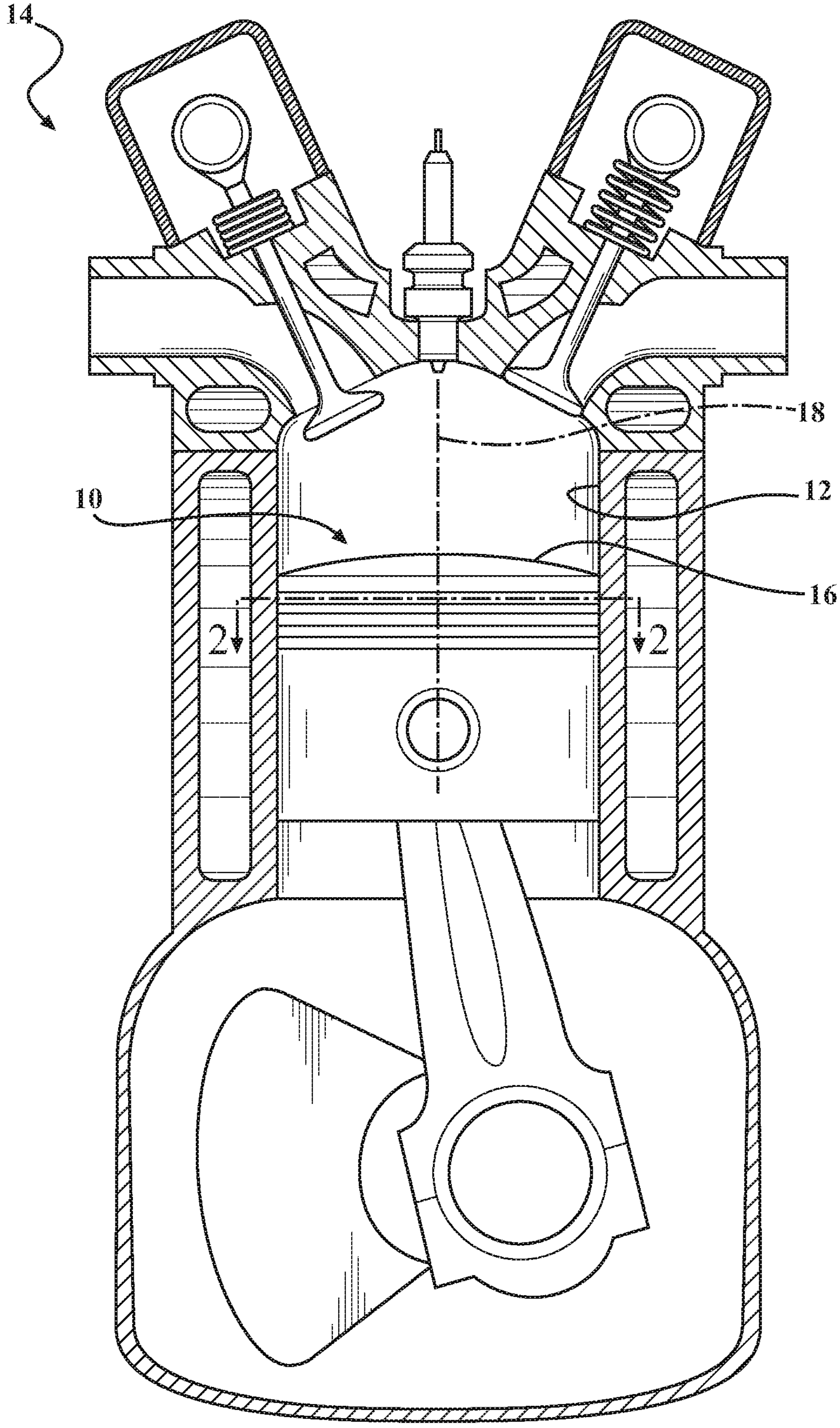
FIG. 1 is a cross-sectional view of an internal combustion engine for a motor vehicle, illustrating the engine having one example of a piston assembly.

Referring to FIG. 1, there is generally illustrated a piston assembly 10 for a cylinder 12 of an internal combustion engine 14 of a motor vehicle. The piston assembly 10 includes a piston head 16 adapted to reciprocate along a longitudinal axis 18 within the cylinder 12.

Figure 2:
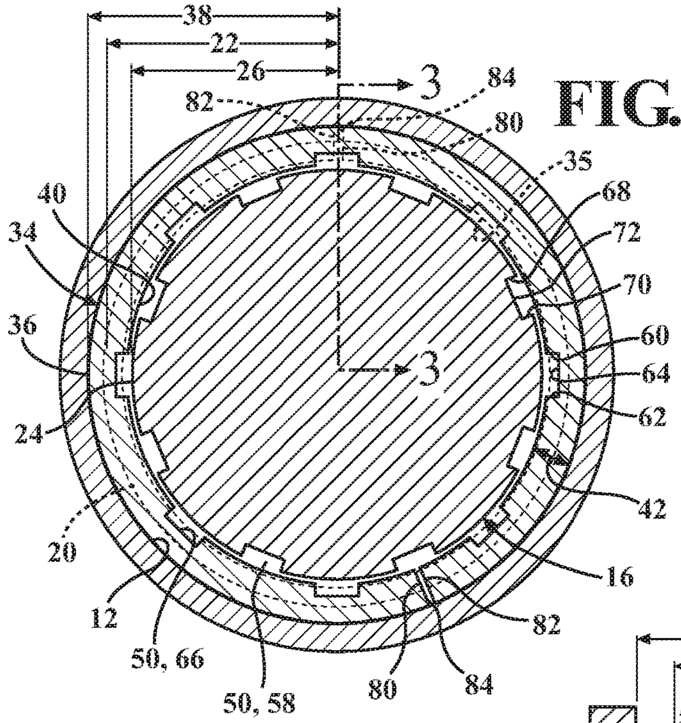
FIG. 2 is a cross-sectional view of the piston assembly of FIG. 1 as taken along line 2-2, illustrating the piston assembly having a piston ring and a piston head each defining a plurality of polygonal-shaped pockets angularly spaced from one another.
Figure 3:
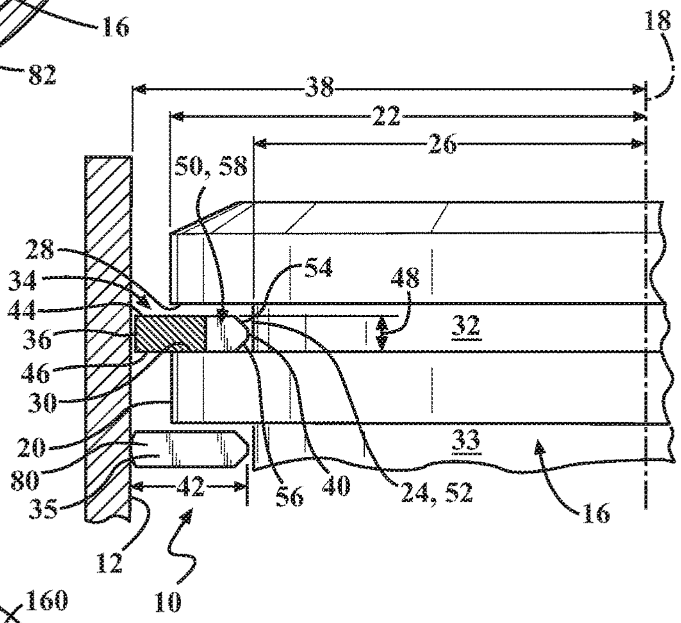
FIG. 3 is a partial cross-sectional view of the piston assembly of FIG. 2, as taken along line 3-3.

Referring to FIGS. 2 and 3, the piston head 16 includes an outer diameter surface 20 spaced a first distance 22 from a longitudinal axis 18. The piston head 16 further includes an annular surface 24 spaced a second distance 26 from the longitudinal axis 18, with the second distance 26 being shorter than the first distance 22. The piston head 16 further includes upper and lower walls 28, 30 (FIG. 3) each extending between the annular surface 24 and the outer diameter surface 20 so as to define an annular groove 32 in the outer diameter surface 20.

The piston assembly 10 further includes a piston ring 34 received within the annular groove 32. The piston ring 34 includes a peripheral surface 36 spaced a third distance 38 from the longitudinal axis 18, with the third distance 38 being longer than the first distance 22 such that the peripheral surface 36 is adapted to slide against a wall of the cylinder 12 in response to the piston head 16 reciprocating within the cylinder 12. The piston ring 34 further includes an inner diameter surface 40 facing the annular surface 24 of the piston head 16. The peripheral surface 36 and the inner diameter surface 40 of the piston ring 34 define a radial wall thickness 42 therebetween. The piston ring 34 further includes top and bottom side faces 44, 46 each extending between the peripheral surface 36 and the inner diameter surface 40. The top and bottom side faces 44, 46 of the piston ring 34 define a longitudinal wall thickness 48 (FIG. 3). While the present examples are directed to a compression ring received within a top groove between the top land and the second land of a piston head, it is contemplated that any combination of other grooves and associated piston rings can have the similar structure.

As best shown in FIG. 2, the inner diameter surface 40 of the piston ring 34 and the annular surface 24 of the piston head 16 cooperate with one another to define a plurality of pockets 50 angularly spaced from one another about the longitudinal axis 18 and configured to receive oil. The pockets can be formed from planar surfaces, concave surfaces, or surfaces having any other suitable shape.

Referring to FIG. 3, the annular surface 24 is a cylindrical surface 52 surrounding the longitudinal axis 18, and the piston ring 34 includes an upper chamfered corner 54 positioned between the top side face 44 and the inner diameter surface 40 and a lower chamfered corner 56 positioned between the bottom side face 46 and the inner diameter surface 40. The annular surface 24 and the chamfered corners 54, 56 cooperate with one another to direct oil to adjacent pockets 50.

Referring back to FIG. 2, the annular surface 24 of the piston head 16 includes a plurality of recesses 58 that provide at least a portion of the pockets 50. Each recess 58 is defined by a pair of planar sidewalls 68, 70 extending perpendicularly from the annular surface 24 and a planar end wall 72 extending between the planar sidewalls 68, 70. The end wall 72 is positioned perpendicularly relative to the planar sidewalls 68, 70. However, it is contemplated that other examples of the piston head can define pockets having outer suitable shapes.

Also, in this example, the inner diameter surface 40 of the piston ring 34 includes a plurality of recesses 66 that provide another portion of the pockets 50. Each recess 66 is defined by a pair of planar sidewalls 60, 62 extending perpendicularly from the inner diameter surface 40 and a planar end wall 64 extending between the planar sidewalls 60, 62. The planar end wall 64 is positioned perpendicularly relative to the planar sidewalls 60, 62. However, it is contemplated that other examples of the piston ring can define pockets having outer suitable shapes.

Figure 4:
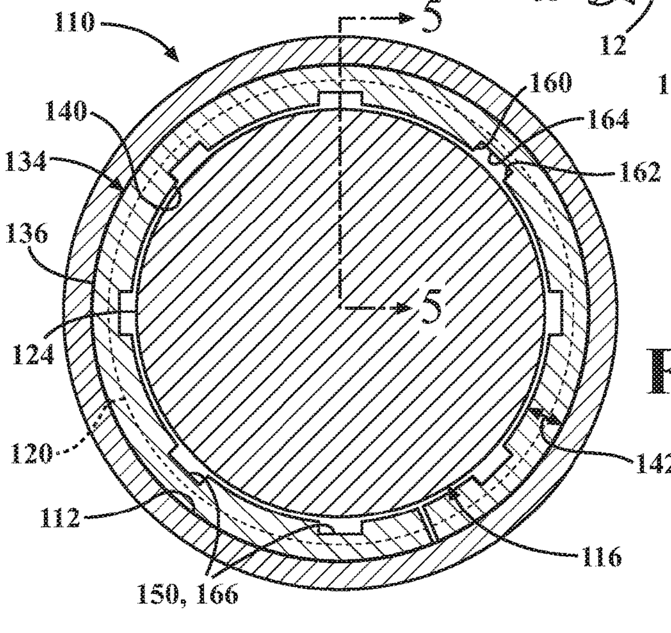
FIG. 4 is a cross-sectional view of another example of a piston assembly, illustrating the piston assembly having a piston ring defining a plurality of polygonal-shaped pockets.
Figure 5:
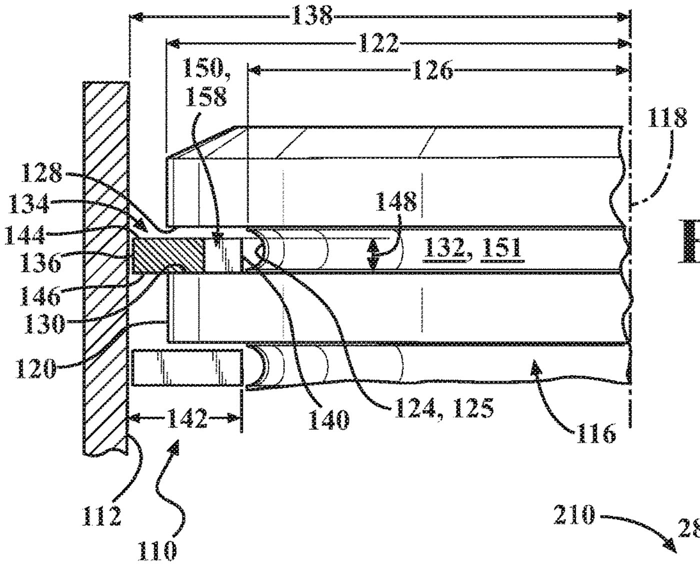
FIG. 5 is a partial cross-sectional view of the piston assembly of FIG. 4 as taken along line 4-4, illustrating the piston head having an annular concave surface that defines a reservoir fluidly communicating with the pockets.

Referring to FIGS. 4 and 5 another example of a piston assembly 110 is substantially similar to the piston assembly 10 of FIG. 2 and has the same components identified by the same numbers increased by 100. However, while the piston assembly 10 of FIG. 2 includes recesses 58 formed in the annular surface 24 of the piston head 16 and recesses 66 formed in the inner diameter surface 40 of the piston ring 34, the piston assembly 110 has recesses 166 formed in only the piston ring 134. The annular surface 124 of the piston head 116 does not include any recesses formed therein.

Referring to FIG. 5, the annular surface 124 is a continuously concave surface 125 extending 360 degrees about the longitudinal axis 118. In this respect, the inner diameter surface 140 of the piston ring 134 and the annular concave surface 125 of the piston head 116 provide an annular reservoir 151 configured to fluidly communicate with each of the pockets 150 such that oil may enter through one or more of the pockets 150 and then collect in the annular reservoir 151.

Figure 6:
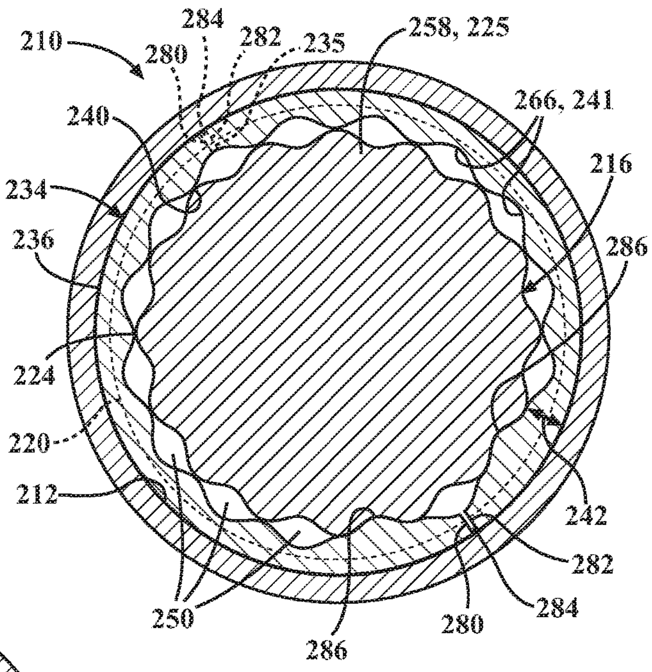
FIG. 6 is a cross-sectional view of another example of the piston assembly, illustrating the piston assembly having a piston ring and a piston head defining a plurality of concave-shaped pockets angularly aligned with one another.

Referring to FIG. 6, another example of a piston assembly 210 is substantially similar to the piston assembly 110 of FIG. 2 and has the same components identified by the same numbers increased by 200. However, while the piston assembly 10 of FIG. 2 includes polygon-shaped recesses 58, 66 angularly spaced from one another about the longitudinal axis, the piston assembly 210 includes concave recesses angularly aligned with one another relative to the longitudinal axis. More specifically, each recess 258 is formed by a concave surface 225 extending radially inward relative to the longitudinal axis 218, and each recess 266 is formed by a concave surface 241 extending radially outward relative to the longitudinal axis 218. While the recesses 58, 66 of FIG. 2, are angularly spaced from one another, the recesses 258 formed in the annular surface 224 of the piston head 216 are angularly aligned with an associated one of the recesses 266 formed in the inner diameter surface 240 the piston ring 234.

Furthermore, while the piston ring 34 of FIG. 2 is angularly movable about the piston head 16, the piston ring 234 of FIG. 6 is rotationally fixed in one angular position relative to the piston head 216. More specifically, the piston assembly 10 of FIG. 2 may include the piston ring 34 in the form of a top compression ring received within the groove 32 proximal to a combustion chamber of the engine, and the assembly may further include a second compression ring 35 (FIG. 3) that is identical to the ring 34 and received in an associated groove 35 below the groove 34. As shown in FIG. 2, each ring 34, 35 is an open or split ring with a pair of opposing ends 80, 82 that define a gap 84. The piston assembly 10 may be installed within the cylinder 12 such that the gaps 84 defined by the associated top compression ring and second compression ring are angularly spaced from one another about the longitudinal axis. During operation of the engine, the rings 34, 35 may rotate on the piston head 16 until the gaps 84 of the rings are angularly aligned with one another (not shown). Combustion gas pressure may move the rings to positions where the gaps of the associated rings 34, 35 are angularly aligned with one another to provide the least resistance to flow of combustion gases from the combustion chamber to the crankcase. In addition, frictional forces associated with the piston assembly reciprocating within the cylinder can further cause the rings to rotate until the gaps are aligned with one another. However, the piston ring 234 of FIG. 6 includes one or more retention surfaces 286 configured to be held in associated recesses 225 when the piston assembly 210 is installed in the engine, such that the piston ring 234 is held in one angular position relative to the piston head 216. The gaps 284 of multiple rings 234, 235 are held angularly spaced from one another to reduce the flow of oil and combustion gases as compared to freely rotating piston rings. In other examples, the retention surface can be formed in the piston head to engage a recess or other complimentary feature in the piston ring.

Figure 7:
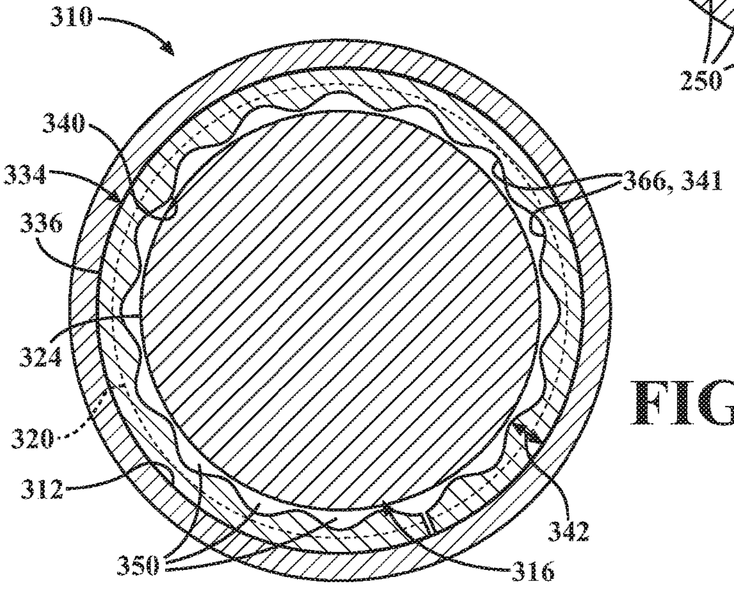
FIG. 7 is a cross-sectional view of another example of a piston assembly, illustrating the piston assembly having a piston ring defining a plurality of concave-shaped pockets.

Referring to FIG. 7 another example of a piston assembly 310 is substantially similar to the piston assembly 210 of FIG. 6 and has the same components identified by the same numbers increased by 100. However, while the piston assembly 210 of FIG. 6 includes recesses 258 formed in the annular surface 225 of the piston head 216 and recesses 266 formed in the inner diameter surface 240 of the piston ring 234, the piston assembly 310 only includes the recesses 366 formed in the inner diameter surface 340 of the piston ring 334. The piston assembly 310 does not include recesses formed in the annular surface 324 of the piston head 316.

It is contemplated that the pockets can be defined by recesses formed in only the piston head, only the piston ring, or both of the piston head and the piston ring. In the example of the piston assembly 10 shown in FIG. 2, a first portion of the pockets 50 are defined by recesses 58, which are formed in the piston head 16 to face toward the piston ring 34, and a second portion of pockets 50 are defined by recesses 66, which are formed in the piston ring 34 to face toward the piston head 16, Similarly, the piston assembly 210 of FIG. 6 includes a first portion of the pockets 250 defined by recesses 258, which are formed in the piston head 216 to face toward the piston ring 234, and a second portion of pockets 250 defined by recesses 266, which are formed in the piston ring 234 to face toward the piston head 216. Furthermore, In the example of the piston assembly 110 shown in FIG. 4, the pockets 150 are defined only by recesses 166, which are formed in only the piston ring 134 to face toward the piston head 116. Similarly, the piston assembly 310 of FIG. 7 includes the pockets 350 defined by only by recesses 358, which are formed in only the piston ring 334 to face toward the piston head 316. In other preferred examples of the piston assembly, the pockets are defined only by recesses, which are formed in only the piston head to face toward the piston ring, with none of recesses being formed in the piston ring.

Figure 8:
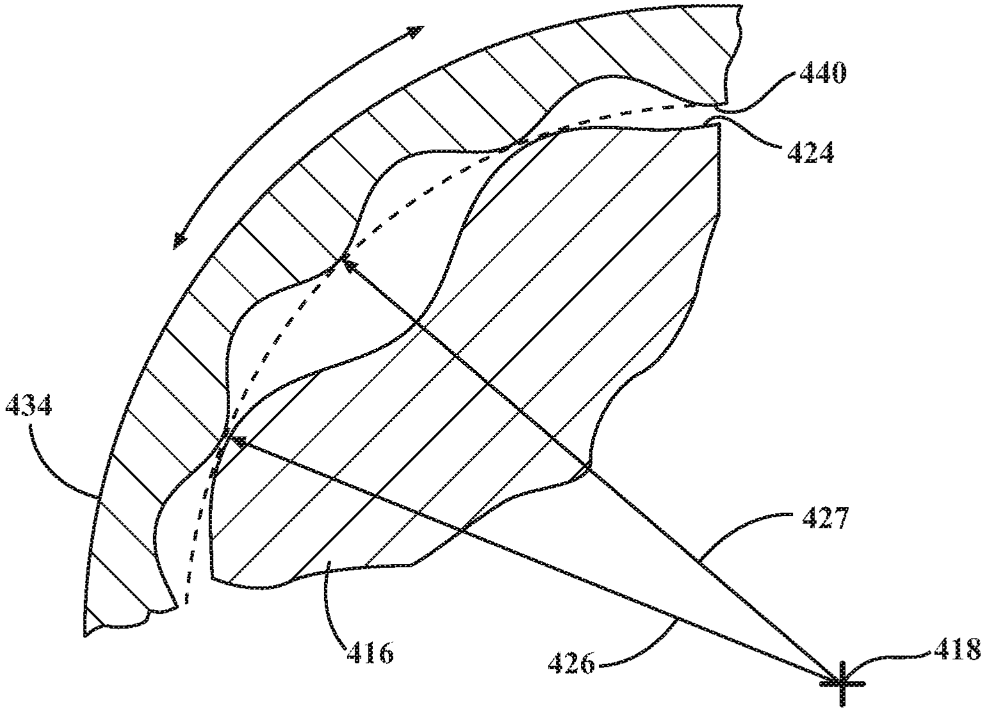
FIG. 8 is an enlarged cross-sectional view of another example of a piston assembly, illustrating the piston assembly having a piston head and a piston ring angularly movable relative to the piston head.

Referring to FIG. 8, another example of a piston assembly 410 is similar to the piston assembly 210 of FIG. 6, and the piston assembly 410 includes the same components identified by reference numbers increased by 200. However, while the piston assembly 210 of FIG. 6 includes a pair of retention surfaces received in associated recesses 225 to hold the piston ring 234 in one fixed angular position relative to the piston head 216, the piston ring 434 of FIG. 8 does not include any retention surfaces, and the piston ring 434 is configured to be angularly movable relative to the piston head 416. More specifically, the inner diameter surface 440 of the piston ring 434 is spaced a distance 427 from the longitudinal axis 418 that is equal to or greater than the distance 426 that the annular surface 424 of the piston head 416 is spaced from the longitudinal axis 418. No portion of the piston head 416 engages the piston ring 434 to prevent its rotation on the piston head 416. While the recesses and protrusions of this example are arcuate, it is contemplated that the recesses and the protrusions can include linear edges, planar surfaces, or other configuration to provide have any suitable profile.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A piston assembly for a cylinder of an internal combustion engine of a motor vehicle, the piston assembly comprising:
- a piston head adapted to reciprocate along a longitudinal axis within the cylinder, wherein the piston head comprises:
  - an outer diameter surface spaced a first distance from a longitudinal axis;
  - an annular surface spaced a second distance from the longitudinal axis with the second distance being less than the first distance; and
  - upper and lower walls each extending between the annular surface and the outer diameter surface so as to define an annular groove in the outer diameter surface; and
- a piston ring received within the annular groove, wherein the piston ring comprises:
  - a peripheral surface spaced a third distance from the longitudinal axis, with the third distance being longer than the first distance such that the peripheral surface is adapted to slide against a wall of the cylinder in response to the piston head reciprocating along the longitudinal axis;
  - an inner diameter surface facing the annular surface of the piston head; and
  - top and bottom side faces each extending between the peripheral surface and the inner diameter surface;
- wherein the inner diameter surface of the piston ring and the annular surface of the piston head cooperate with one another to define a plurality of pockets angularly spaced from one another about the longitudinal axis and configured to receive oil;
- wherein the piston ring is rotationally fixed in one angular position relative to the piston head;
- wherein the top and bottom side faces of the piston ring define a longitudinal wall thickness;
- wherein the peripheral surface and the inner diameter surface of the piston ring define a radial wall thickness therebetween; and
- wherein the annular surface of the piston head includes a plurality of recesses that forms at least a portion of the pockets.

2. The piston assembly of claim 1 wherein each of the recesses comprises a pair of planar sidewalls extending perpendicularly from the annular surface and a planar end wall extending between the planar sidewalls.

3. The piston assembly of claim 2 wherein the planar end wall is positioned perpendicularly relative to the planar sidewalls.

4. The piston assembly of claim 1 wherein each of the recesses comprises a concave surface of the piston head that extends radially toward the longitudinal axis.

5. The piston assembly of claim 1 wherein the inner diameter surface of the piston ring includes a plurality of recesses that form at least a portion of the pockets.

6. The piston assembly of claim 5 wherein each of the recesses comprises a pair of planar sidewalls extending perpendicularly from the inner diameter surface and a planar end wall extending between the planar sidewalls.

7. The piston assembly of claim 6 wherein the planar end wall is positioned perpendicularly relative to the planar sidewalls.

8. The piston assembly of claim 5 wherein each of the recesses comprises a concave surface that extends radially outwardly relative to the longitudinal axis.

9. The piston assembly of claim 1 wherein the inner diameter surface is spaced a fourth distance from the longitudinal axis, and the fourth distance is longer than the second distance such that the piston ring is angularly movable relative to the piston head.

10. A piston assembly for a cylinder of an internal combustion engine of a motor vehicle, the piston assembly comprising:
- a piston head adapted to reciprocate along a longitudinal axis within the cylinder, wherein the piston head comprises:
  - an outer diameter surface spaced a first distance from a longitudinal axis;
  - an annular surface spaced a second distance from the longitudinal axis with the second distance being less than the first distance; and
  - upper and lower walls each extending between the annular surface and the outer diameter surface so as to define an annular groove in the outer diameter surface; and
- a piston ring received within the annular groove, wherein the piston ring comprises:
  - a peripheral surface spaced a third distance from the longitudinal axis, with the third distance being longer than the first distance such that the peripheral surface is adapted to slide against a wall of the cylinder in response to the piston head reciprocating along the longitudinal axis;
  - an inner diameter surface facing the annular surface of the piston head; and
  - top and bottom side faces each extending between the peripheral surface and the inner diameter surface;
- wherein the inner diameter surface of the piston ring and the annular surface of the piston head cooperate with one another to define a plurality of pockets angularly spaced from one another about the longitudinal axis and configured to receive oil;
- wherein the piston ring further comprises an upper chamfered corner positioned between the top side face and the inner diameter surface and a lower chamfered corner positioned between the bottom side face and the inner diameter surface;
- wherein the piston ring is rotationally fixed in one angular position relative to the piston head;
- wherein the top and bottom side faces of the piston ring define a longitudinal wall thickness;

wherein the peripheral surface and the inner diameter surface of the piston ring define a radial wall thickness therebetween; and wherein the annular surface of the piston head includes a plurality of recesses that forms at least a portion of the pockets.

11. The piston assembly of claim 10 wherein the inner diameter surface of the piston ring includes a plurality of recesses forming at least a portion of the pockets.

12. The piston assembly of claim 11 wherein each of the recesses comprises a pair of planar sidewalls extending perpendicularly from the inner diameter surface and a planar end wall extending between the planar sidewalls.

13. The piston assembly of claim 12 wherein the planar end wall is positioned perpendicularly relative to the planar sidewalls.

* * * * *